United States Patent
Piazza et al.

(10) Patent No.: US 6,191,793 B1
(45) Date of Patent: Feb. 20, 2001

(54) METHOD AND APPARATUS FOR TEXTURE LEVEL OF DETAIL DITHERING

(75) Inventors: Thomas A. Piazza, Granite Bay, CA (US); Michael Mantor, Orlando, FL (US); Ralph Clayton Taylor, Deland, FL (US); Steven Manno, Ormond Beach, FL (US)

(73) Assignee: Real 3D, Inc., Orlando, FL (US)

( * ) Notice: Under 35 U.S.C. 154(b), the term of this patent shall be extended for 0 days.

(21) Appl. No.: 09/053,591

(22) Filed: Apr. 1, 1998

(51) Int. Cl.[7] .................................................... G06T 11/40
(52) U.S. Cl. ............................ 345/430; 345/152; 345/149
(58) Field of Search ..................................... 345/430, 152, 345/149

(56) References Cited

U.S. PATENT DOCUMENTS

| | | |
|---|---|---|
| 4,737,921 | 4/1988 | Goldwasser et al. . |
| 4,786,976 | 11/1988 | Takao et al. . |
| 4,992,780 | 2/1991 | Penna et al. . |
| 4,992,781 | 2/1991 | Iwasaki et al. . |
| 5,097,427 | 3/1992 | Lathrop et al. . |
| 5,175,807 | 12/1992 | Cawley et al. . |
| 5,179,638 | 1/1993 | Dawson et al. . |
| 5,185,808 | 2/1993 | Cox . |
| 5,185,856 | 2/1993 | Alcorn et al. . |
| 5,214,753 | 5/1993 | Lee et al. . |
| 5,218,350 | 6/1993 | Bollman . |
| 5,222,205 | 6/1993 | Larson et al. . |
| 5,224,208 | 6/1993 | Miller, Jr. et al. . |
| 5,295,245 | 3/1994 | Alcorn et al. . |
| 5,301,269 | 4/1994 | Alcorn et al. . |
| 5,315,693 | 5/1994 | Hirosawa . |
| 5,319,742 | 6/1994 | Edgar . |
| 5,357,604 | 10/1994 | San et al. . |
| 5,388,841 | 2/1995 | San et al. . |
| 5,404,427 | 4/1995 | Cawley et al. . |
| 5,481,653 | 1/1996 | Kashiwagi et al. . |
| 5,485,558 | 1/1996 | Weise et al. . |
| 5,490,240 | 2/1996 | Foran et al. . |
| 5,493,644 | 2/1996 | Thayer et al. . |
| 5,495,563 | 2/1996 | Winser . |
| 5,544,292 | 8/1996 | Winser . |
| 5,566,284 | 10/1996 | Wakayama . |
| 5,586,234 | 12/1996 | Sakuraba et al. . |
| 5,594,854 | 1/1997 | Baldwin et al. . |
| 5,596,687 | 1/1997 | Peters, Jr. . |
| 5,602,943 | 2/1997 | Velho et al. . |
| 5,606,650 | 2/1997 | Kelley et al. . |
| 5,625,374 | 4/1997 | Turkowski . |

(List continued on next page.)

FOREIGN PATENT DOCUMENTS

WO 97/41534   11/1997   (GB) .

OTHER PUBLICATIONS

Web Page, URL, http://www.s3.com/savage3d/3linear.htm 'Savage3D. white papers, Trilinear Filtering: A Better Way to Texture 3D Objects', See reference to "Another way of approximating correct trilinear filtering is to dither the LOD variable so that . . . ".

*Primary Examiner*—Mark R. Powell
*Assistant Examiner*—Motilewa Good-Johnson
(74) *Attorney, Agent, or Firm*—Scully, Scott, Murphy & Presser

(57) ABSTRACT

A computationally efficient method for minimizing the visible effects of texture LOD transitions across a polygon. The minimization is accomplished by adding a dithering offset value to the LOD value computed for each pixel covered by a graphics primitive to produce a dithered pixel LOD value. The dithering offsets mat be generated from a table look-up based on the location of the pixel within a span of pixels. The dithered pixel LOD value is used to as an index in the selection of a single LOD texture map from which a textured pixel value is retrieved. The range of dithering offset values can be adjusted by modulating the values in the table look-up.

19 Claims, 8 Drawing Sheets

U.S. PATENT DOCUMENTS

| | | |
|---|---|---|
| 5,649,172 | 7/1997 | Tang . |
| 5,649,173 | 7/1997 | Lentz . |
| 5,706,105 | 1/1998 | Naylor et al. . |
| 5,714,975 | 2/1998 | Spackman . |
| 5,715,384 | 2/1998 | Ohshima et al. . |
| 5,724,497 | 3/1998 | San et al. . |
| 5,727,192 | 3/1998 | Baldwin . |
| 5,739,818 | 4/1998 | Spackman . |
| 5,740,343 | 4/1998 | Tarolli et al. . |
| 5,748,867 | 5/1998 | Cosman et al. . |
| 5,751,295 | 5/1998 | Becklund et al. . |
| 5,757,374 | 5/1998 | Nakamura et al. . |
| 5,757,376 | 5/1998 | Suzuoki et al. . |
| 5,760,792 | 6/1998 | Holt et al. . |
| 5,764,228 | 6/1998 | Baldwin . |
| 5,764,243 | 6/1998 | Baldwin . |
| 5,772,297 | 6/1998 | Loo et al. . |
| 5,777,599 | 7/1998 | Poduska, Jr. . |
| 5,777,629 | 7/1998 | Baldwin . |
| 5,790,134 | 8/1998 | Lentz . |
| 5,793,376 | 8/1998 | Tanaka et al. . |
| 5,793,386 | 8/1998 | Larson et al. . |
| 5,794,016 | 8/1998 | Kelleher . |
| 5,794,037 | 8/1998 | Young . |
| 5,798,762 | 8/1998 | Sfarti et al. . |
| 5,798,770 | 8/1998 | Baldwin . |
| 5,801,714 | 9/1998 | Holt . |
| 5,831,624 | 11/1998 | Tarolli et al. . |

METHOD AND APPARATUS FOR TEXTURE LEVEL OF DETAIL DITHERING

BACKGROUND OF THE INVENTION

Technical Field

The present invention relates generally to real time computer image generation systems, and, more particularly, to means and method for texture map filtering.

Description of the Related Art

In computer image generation systems, texture mapping may be used to achieve realistic image reproduction for objects or features to be displayed. Texture mapping is a technique that applies an image to an object's surface. The general benefit provided by the application of texture mapping is to add realism. Many methods have been employed to accomplish texture mapping. Irrespective of which method one selects, when a texture map is created it will have a certain number of cells in the matrix. The number of cells in the matrix (e.g. 256×256), is the resolution of the texture map. The resolution represents the object at a certain predetermined apparent distance which is known as a level of detail. This "apparent distance" is a function of the size of the field of view, the distance of the viewer to the object and the orientation of the object. As an object moves in relative distance from the viewer a problem occurs in determining the texture color value in that it becomes computationally burdensome to include all of the cells in the texture map that contribute to the individual pixels within the object to be textured. The solution is to store a sequence of texture maps of the same texture pattern to be used at different relative distances from the object to the viewer. This sequence of texture maps is sometimes called a zoom pyramid. The zoom pyramid starts with a high resolution texture map and includes successive maps that are lower resolution versions of the previous map in the pyramid. The zoom pyramid effectively divides the scene to be displayed into a plurality of predetermined range intervals, where each range interval corresponds to a different respective level of detail (LOD). Creating texture maps at different relative distances from the object to the viewer is known as establishing multiple texture levels of detail (LODs). The manner in which the LODs are created is by establishing a base LOD which will be the texture map with the highest resolution, in other words the greatest number and smallest sized cells for a predetermined area. The highest resolution texture map is closest to the observer and is used for applying the texture to an object when the object is near to the viewer. Lower resolution versions are arranged to contain a respective decreasing amount of detail with correspondingly smaller number and larger sized cells for the same area. The lower resolution versions are created by filtering the cell data from the previous map and are used for applying texture as the object moves further from the viewer. In the texture mapping process, a determination must be made of which texture maps in the zoom pyramid to use based on the distance the object appears to be to the viewer or apparent distance. The LOD calculation makes this determination. The LOD calculation is based on a texture cell to pixel size comparison and selects the two consecutive texture maps that have the nearest cell to pixel size correspondence. The resolution of these two maps are of such resolution such that they bracket the object to be textured. Data from each of these two texture LOD maps is retrieved from memory. The data from each map is filtered using a 2D weighting function such as bilinear interpolation. The filtered data from these two texture LOD maps is then blended by linear interpolation depending on the location of the object between the two selected texture LODs. The LOD blending provides a smooth transition between texture LODs when the object is moving in the scene between the distances set for the two selected texture LODs. This technique of filtering in two successive maps and a linear interpolation is commonly referred to as trilinear interpolation and is described in U.S. Pat. No. 4,727,365. Retrieving data with this method has a constant associated cost of eight pixel accesses and between seven and thirteen multiplies per screen pixel.

A simpler method that is often used to save computations, is to only filter the texels in the closer LOD map, LOD N, of the zoom texture pyramid. The bilinearly filtered texture value from the closer map would require only four pixels accesses and less than one half the multiplies per pixel as trilinear interpolation. As the apparent distance to the polygon increases, the LOD map used to obtain the pixel value will jump from LOD N to LOD N+1 at some pre-established threshold distance, at which point the filtering will occur exclusively in LOD N+1. This simplified approach eliminates the step of blending between the two LOD levels, as required in trilinear interpolation. This method, however, while computationally more efficient than trilinear interpolation, produces undesirable visible artifacts for most texture maps as the apparent distance changes. As a consequence, there exists a need for a simplified, computationally inexpensive method of texture map filtering that does not produce associated undesirable visible artifacts.

SUMMARY OF THE INVENTION

It is therefore an object of the present invention to provide a method of LOD selection which is computationally efficient and, thereby reduces texture memory bandwidth requirements, while at the same time significantly reduces the visible artifacts over conventional methods In order to attain the above object, according to the present invention, there is provided a method for minimizing the visible effects of texture Level of Detail (LOD) transitions across a polygon without the need for the more expensive and accurate linear blending between two filtered LODs used in trilinear interpolation. The method of the present invention comprises the steps of: 1) computing a texture LOD value for each pixel covered by a graphics primitive (e.g. polygon), 2) applying a dithering offset value to each computed LOD value resulting in a dithered pixel LOD value, and 3) obtaining texture data from the LOD texture map identified by the dithered pixel LOD value.

In an illustrative embodiment, screen space is comprised of a plurality of spans, wherein each span is further comprised of a grid of pixels, for example, of dimension 4×4. The method of the present invention calculates an LOD value for each pixel covered by a polygon in a span. The method will be applied to those covered pixels in a subsequent span. Further details regarding span processing can be found in U.S. Pat. No. 4,811,245 as well as U.S. Patent Application Serial Number 09/053,589, (ATTY DOCKET 10874) filed concurrently herewith, both of which are incorporated herein in their entirety by reference thereto. The method further requires the creation of a matrix of dither values, which may be stored in a look-up table or equivalent storage device.

Application of a dithering offset to the computed LOD value has the potential effect of pushing some computed texture pixel values to the far texture LOD map (LOD=N+1), and pulling other pixel texture values to the near LOD map (LOD=N). Pursuant to the method of the invention, a dithered offset value is applied, such as by adding, multiplying, etc., to the computed pixel LOD value. The integer result of the application, after roundoff or truncation, identifies either the near or far texture map for filtering. A certain percentage of computed LOD pixel values will be unaffected by the addition of the dithering offset while others will point to a map different than what would have been selected prior to any dither offset application. If a dithering offset value is negative, the change will be to pull the selected LOD map back to the near map. If the dithering offset is a positive number the change will result in the LOD selection being pushed up to the far map.

It is appropriate here to define certain terms. The dithering offset values are the values that are applied to the conventional computed pixel LOD value. The dithering offset range is set by the minimum and maximum values of the matrix of dithering offset values that are stored for use in the method. The dither range is the value obtained by subtracting the minimum value from the maximum value. The dithered LOD range is the range of computed LOD values in which the selected LOD is changed due to the dithering method of the present invention.

The dithering offset range will determine the dithered LOD range which as noted above is the range of computed LOD texture values affected. It is observed, however, that for certain applications, only a certain dithering offset range will yield acceptable results. One possible subjective measure of the effectiveness of the present method depends on the eye integrating the dithered result across the pixel array (e.g., span). Ranges which are either too wide or too narrow will have associated undesirable visual artifacts. If, for example, the values of the dithering offsets are in the range of (0 to 0.75) or (0 to 1) an undesirable visual artifact results in that the eye will sometimes perceive the selection of two adjacent texture maps as two superimposed images. For small dithering offset ranges, such as 0 to 0.2, the dithered LOD range will be small and the eye will often perceive a jumping between two adjacent LOD maps as the apparent distance changes. Dither ranges from 0.4 to 0.6 have been determined to provide the best results for most applications, however, what range will be best will be application specific.

In another embodiment of the present invention, the amount of dithering offset applied to the computed LOD value is modulated according to a control state variable setting. The modulation is user selectable and can define discrete modulation steps. The modulation may attenuate or amplify the dithering offset values. For example, an attenuator may reduce the dithering offset in steps of: half, quarter, eighth and no attenuation. The applied attenuation can be modified either per polygon, per texture, or both. Through modification of the degree of attenuation the dithering offset range is correspondingly affected. More specifically, as increasing amounts of attenuation are applied, the corresponding maximum dithering offset is reduced which translates to a narrower range of affected pixel offset values.

A computational savings is realized by the present method by filtering each pixel in only the closer LOD texture map of a zoom texture pyramid. This eliminates the step of blending between the filtered results in the two adjacent LODs that are required for trilinear interpolation.

The various features of novelty which characterize the invention are pointed out with particularity in the claims annexed to and forming a part of the disclosure. For a better understanding of the invention, its operating advantages, and specific objects attained by its use, reference should be made to the drawings and descriptive matter of which there are illustrated and described preferred embodiments of the invention.

DETAILED DESCRIPTION OF THE PREFERRED EMBODIMENTS

The present invention is directed to a method for applying dithering offsets to computed texture LOD values to minimize the visible effects of texture Level of Detail (LOD) transitions across a polygon without the need for the more expensive and accurate linear blending between two filtered LODs as used in trilinear interpolation. The dithering offsets are typically represented by values which are applied for individual pixels based on the pixel's position in screen (display) space.

Figure 1:
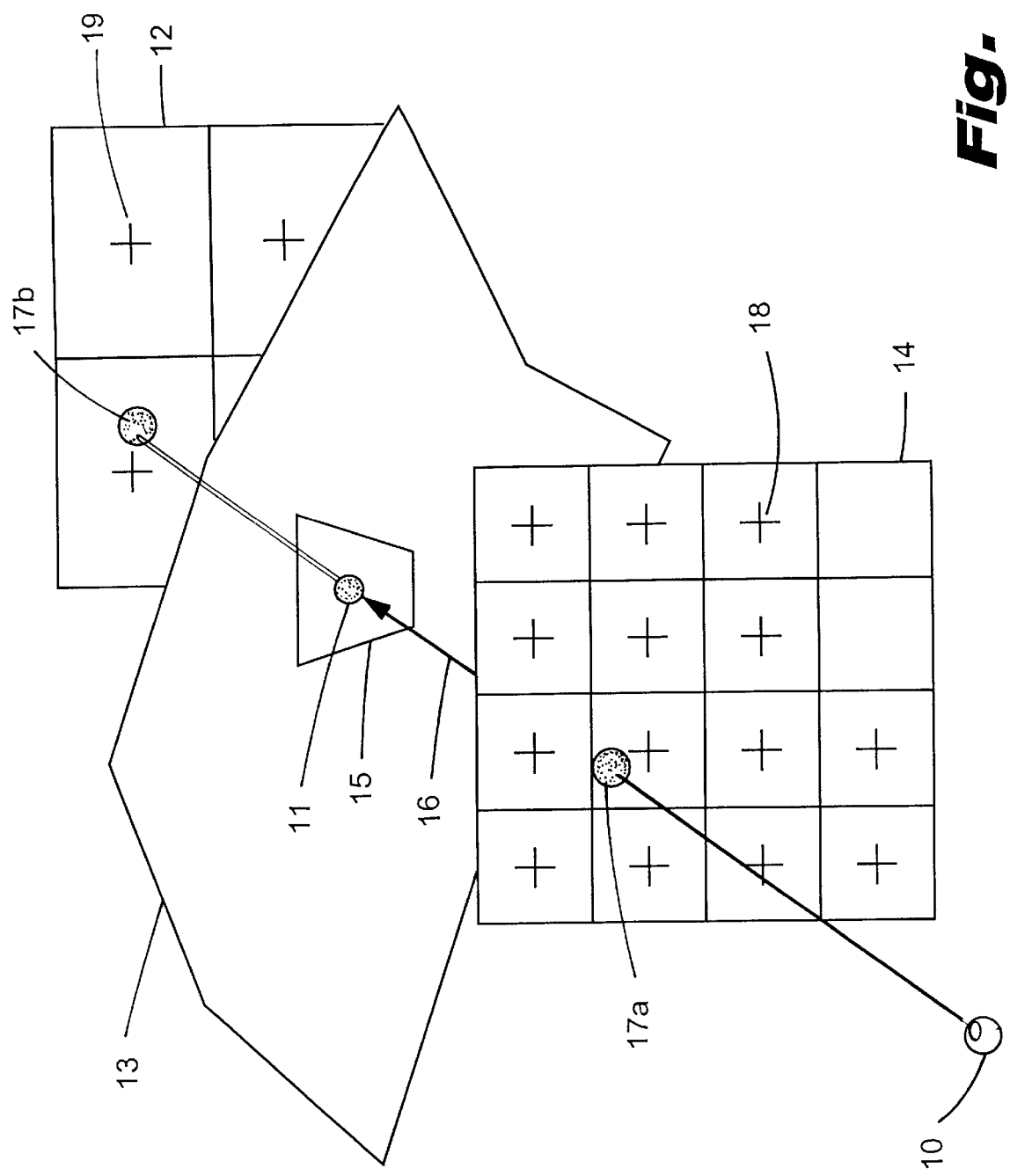
FIG. 1 illustrates a trilinear interpolation filtering method of the prior art.

Referring now to FIG. 1, there is shown pictorial representation of the method of computing an LOD value for a pixel for applying texture to the surface of a polygon. The method comprises the steps of determining an apparent distance of the viewer 10 to the object represented by surface 13. The apparent distance, represented by arrow 16 is computed for each pixel that the surface 13 covers on the display screen by comparing the size of the pixel to the size of the texture cells or texels in the zoom pyramid of texture maps. FIG. 1 shows a pixel 15 as it appears after being projected into the zoom pyramid. The projected pixel 15 has center 11. Two LOD texture maps 12 and 14 represent LOD N and LOD N+1, respectively. LOD 14 has texels 18 of one size based on its resolution and LOD 12 has texels 19 of a larger size based on it having a lower resolution than LOD 14. For pixel 15 the pixel size/texel size comparison determines that the pixels falls between the two maps where the sizes most closely correspond. The results of the comparison is a number consisting of an integer and a fraction, such as 3.2, which represents the apparent distance 16 of the object 13 to the viewer 10. Thereafter, for trilinear interpolation, an interpolation of texture values that correspond to the four texels within each respective map that surround the projections 17a and 17b, respectively, is performed to produce a single texture value in each map. The interpolation within each map could be any 2-D interpolation method, including bilinear interpolation. The two computed values are then utilized as input to a 1-D interpolation between the two results. It is observed that this method represents the most realistic method of texturing polygons in a computer generation system. This method, while it is extremely accurate, it is computationally expensive for today's desire to design 3D rendering computer chips for use in PCS.

Figure 2:
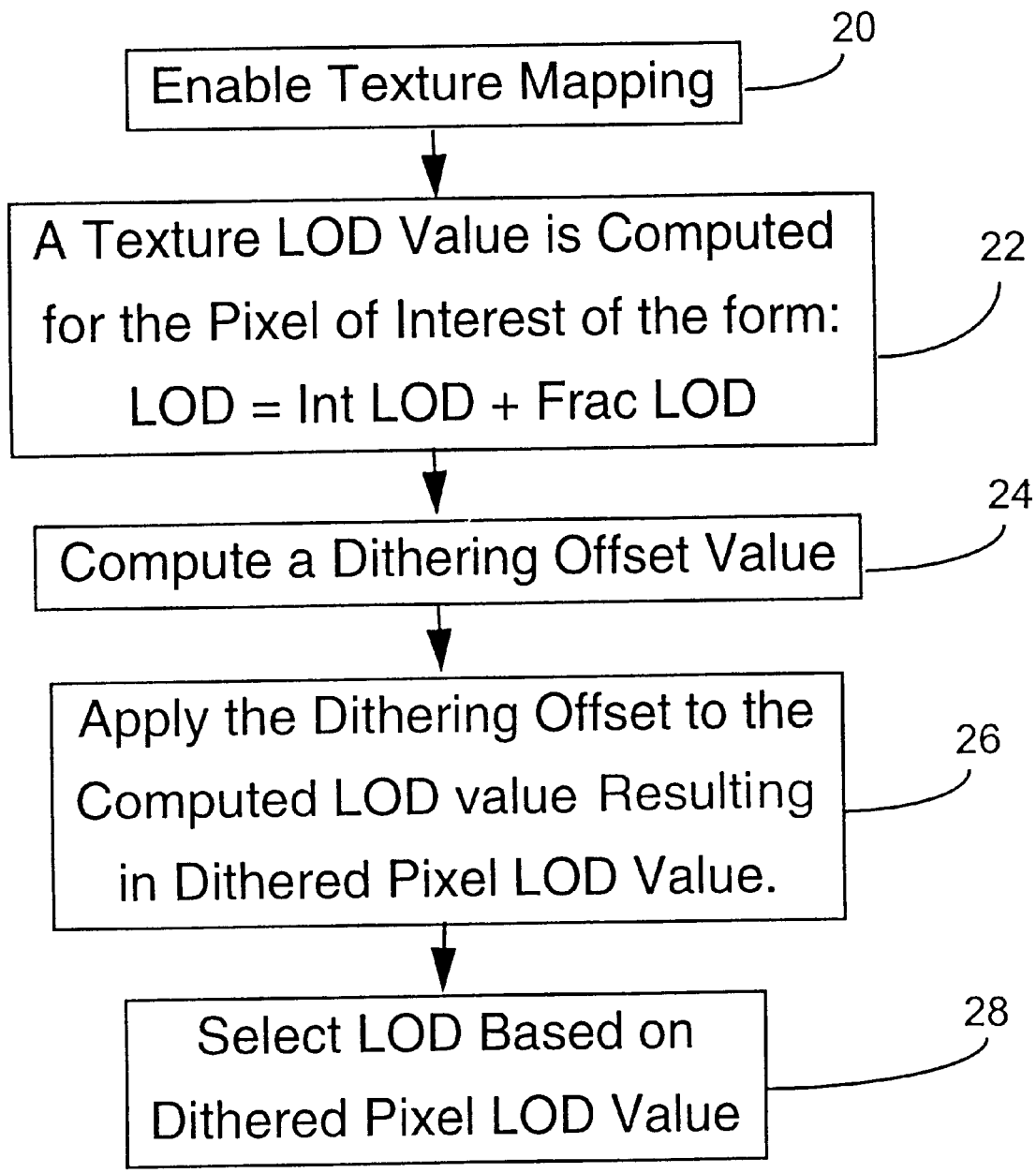
FIG. 2 illustrates the method steps of the present invention for a single pixel.

FIG. 2 is a flowchart describing the general method steps which constitute the present invention. The method is started at step 20 by enabling texture mapping for pixels covered by an object. At step 22 a texture LOD value is computed for the pixel of interest and can be represented as consisting of an integer component, intLOD, and a fractional component, fracLOD (i.e. LOD=intLOD.fracLOD). The integer component represents the nearest (from the viewer) LOD map to be used, LOD=N, while the fractional component represents the relative distance of the pixel LOD value between the near and far texture maps. Prior to any potential contributions from the addition of a dithering offset, the near texture LOD map, LOD=N, would be selected to retrieve a texture value whenever the fractional LOD component, fracLOD, is less than one half (½). When the fractional LOD is greater than or equal to one half the far texture LOD map, LOD=N+1, is selected to retrieve a texture value.

At step 24 a dithering offset is computed. In the preferred embodiment, the dithering offset computed by first determining the display (I,J) coordinate of the pixel of interest and using the (I,J) address as an index into a table-look up to retrieve a dither offset value. Alternatively, combinational logic could be used to calculate the dithering offset value based on the location of the pixel. The dithering offset computation could be based on the location of the pixel in a span of pixels if polygons are being rendered using span processing. At step 26 the computed dithering offset value is applied to the computed LOD value from step 24 and the result is the dithered pixel LOD value. The dithered pixel LOD value will also be in the form of integer and fractional values. The LOD selection is then made in step 28 by either rounding off where 0.5 or greater selects the higher LOD number and less than 0.5 selects the lower LOD. Truncation can also be used where the LOD is selected based solely on the integer value. It is observed applying the dithering offset has the effect of "pulling" the computed texture LOD values for some pixels to the near integer texture map value, LOD=N, that otherwise would have been selected from the far map. Similarly, the offset may "push" other computed LOD values to the far texture LOD map, LOD=N+1 that otherwise would have selected the near map. When round-off is used, pulling to the near texture map occurs when the fractional portion of the result of step 26 is less than one-half the distance between the near and far texture maps. A push to the far map occurs when the fractional portion of the result of step 26 is equal to or exceeds one-half the distance between the two texture maps.

Figure 3:
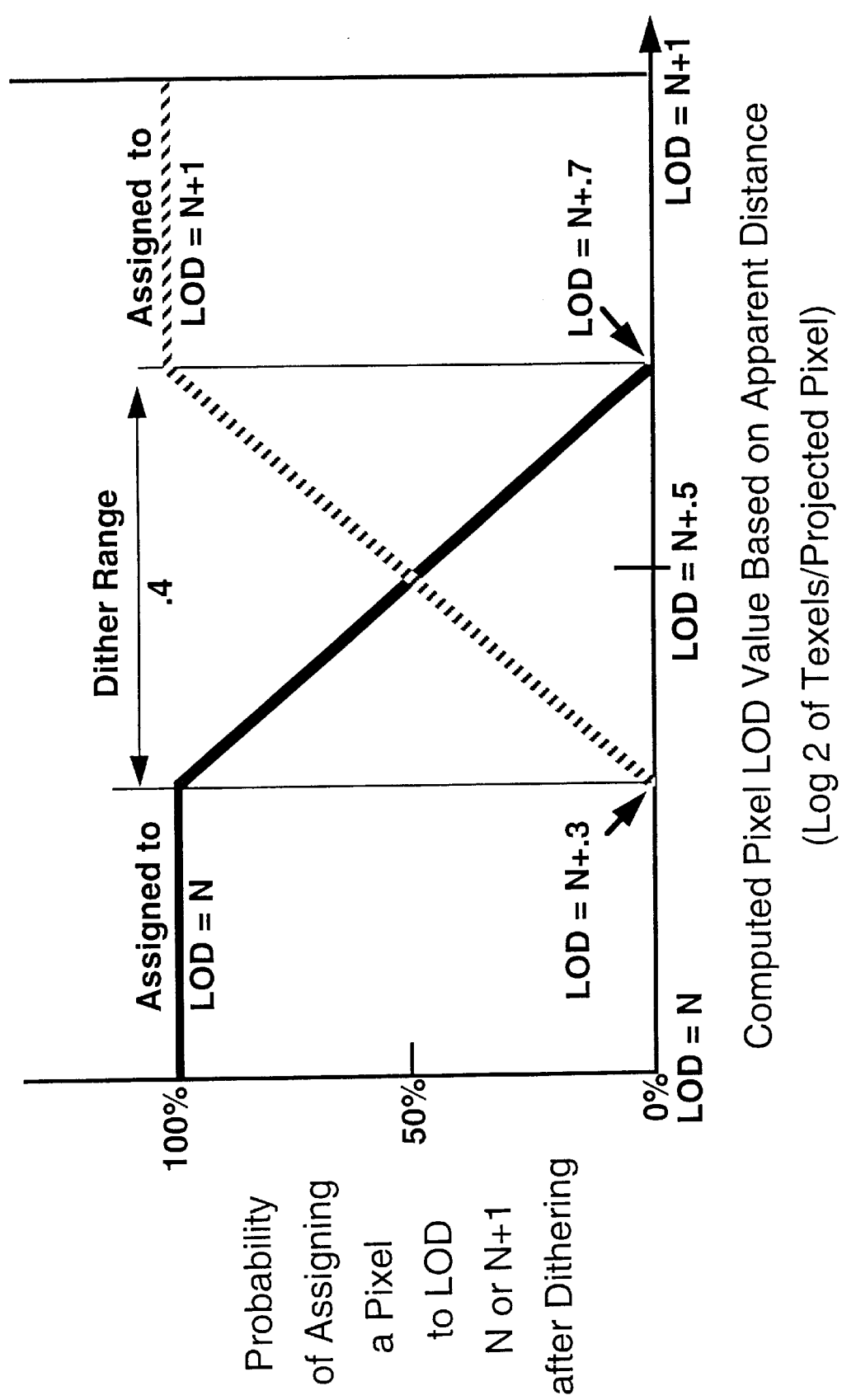
FIG. 3 graphically illustrates the result of dithering for a dither range of 0.4.

FIG. 3 illustrates by example the probability of a computed pixel LOD value being assigned to either the near texture map, LOD=N, or the far texture map, LOD=N+1, for a selected dither range of 0.4. There are many dithering offset ranges that will have a dither range of 0.4. One such range is (−0.2 to +0.2) and another is (0 to 0.4). The graph of FIG. 3 shows the probability for the dithering offset range of (−0.2 to +0.2) and rounding is used. If truncation is used, the graph would still apply if a bias of 0.5 was added to the dithering offset. The application of bias values will be explained in connection with FIG. 7. In addition, the graph would also apply for a dithering offset range of (0 to 0.4), if a bias is added. For rounding, the bias must be (−0.2) and for truncation the bias must be (+0.3).

In this example (offset range −0.2 to +0.2), the dithering offsets are added to the computed pixel LOD value. It is observed that all pixels with computed LODs, prior to the addition of a dither offset, of less than N+0.3, will be automatically assigned to the near texture map, LOD N, with a probability of 100%. The dithering offset, given the dither range of 0.4, has no effect on these computed values. It is also observed that all pixels with computed LODs N+0.7 and larger will be automatically assigned to the far texture map, LOD N+1. Again, the dithering offsets will have no effect on these computed pixel LOD values. Only those pixels whose computed LOD values lie in the range of (N+0.3 to less than N+0.7) will have some probability of being assigned to a different LOD map because of the addition of a dithering offset. By example, pixels with a computed LOD of N+0.5, have a 50% probability of being assigned to either LOD N or LOD N+1. It is observed widening the dither range would affect a larger percentage of computed pixel LOD values as candidates for selection to either map N or N+1. In the example shown only those computed LOD values in the narrow range of N+0.3 to less than N+0.7 are candidates to be pushed or pulled, all other values are immediately assigned to a particular map irrespective of the contribution of the dithering offset.

Figure 4:
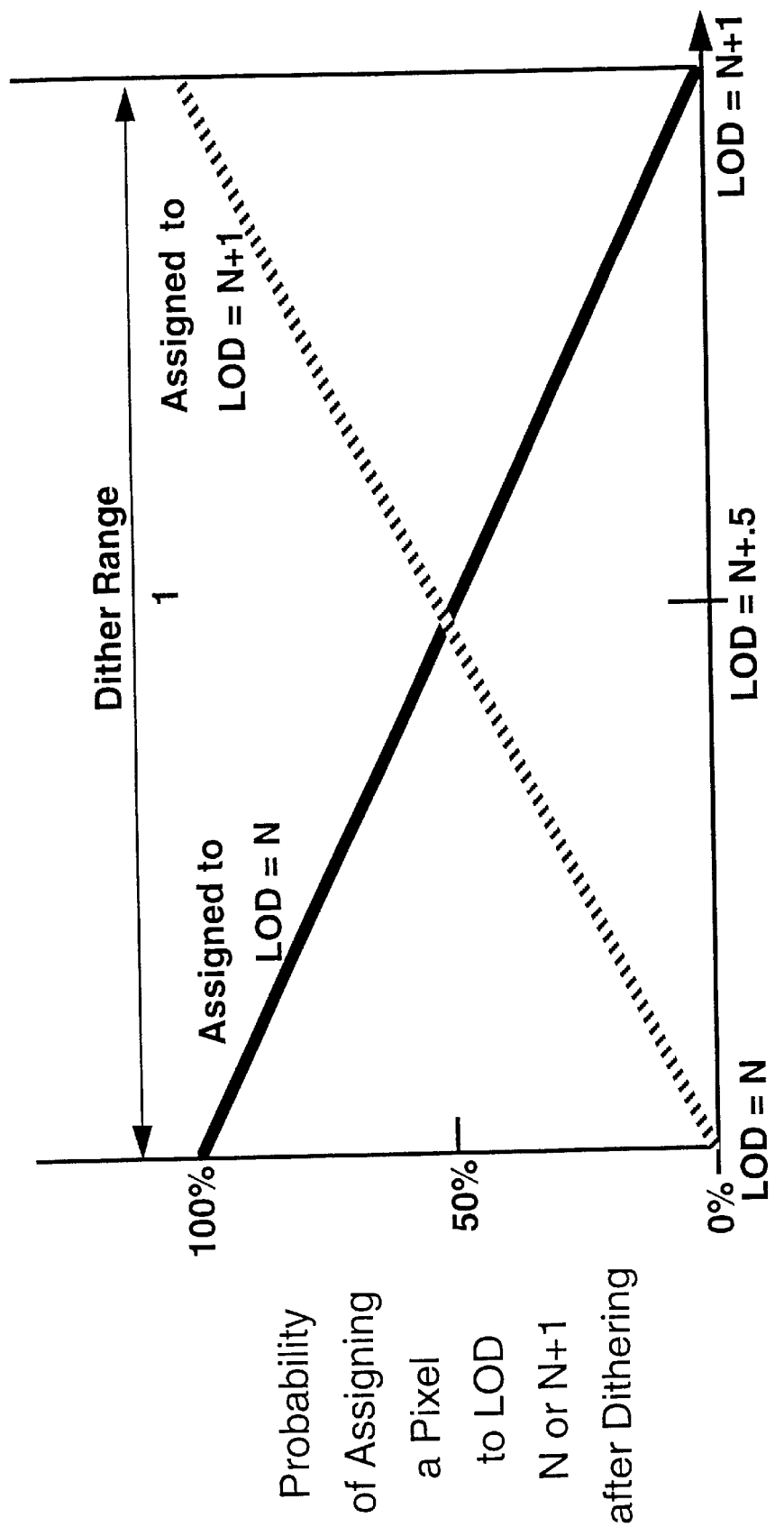
FIG. 4 graphically illustrates the result of dithering for a dither range of 1.

FIG. 4 illustrates the probability of a computed pixel LOD value being "pushed" or "pulled" for the dither range of 1. Again, the dither range can be achieved by many offset ranges, such as, (−0.5 to +0.5) or (0 to 1). The graph shows the probability for a range of dithering values of (−0.5 to +0.5) if rounding is used or if truncation is used this same range plus a bias of +0.5. For a range of (0 to 1) the graph of FIG. 4 applies if truncation is used or if rounding is used a bias of (−0.5) must be added. In this example, the computed LOD texture values for all computed pixel LOD values would be candidates to be either pulled into the near texture map or pushed into the far texture map. There is no equivalent region of automatic allocation as illustrated in FIG. 3 by the ranges. It is therefore apparent, from the examples illustrated in FIGS. 3 and 4 that by adjusting the range of the dithering offsets the region of the computed LOD texture values can be controlled.

Figure 5:
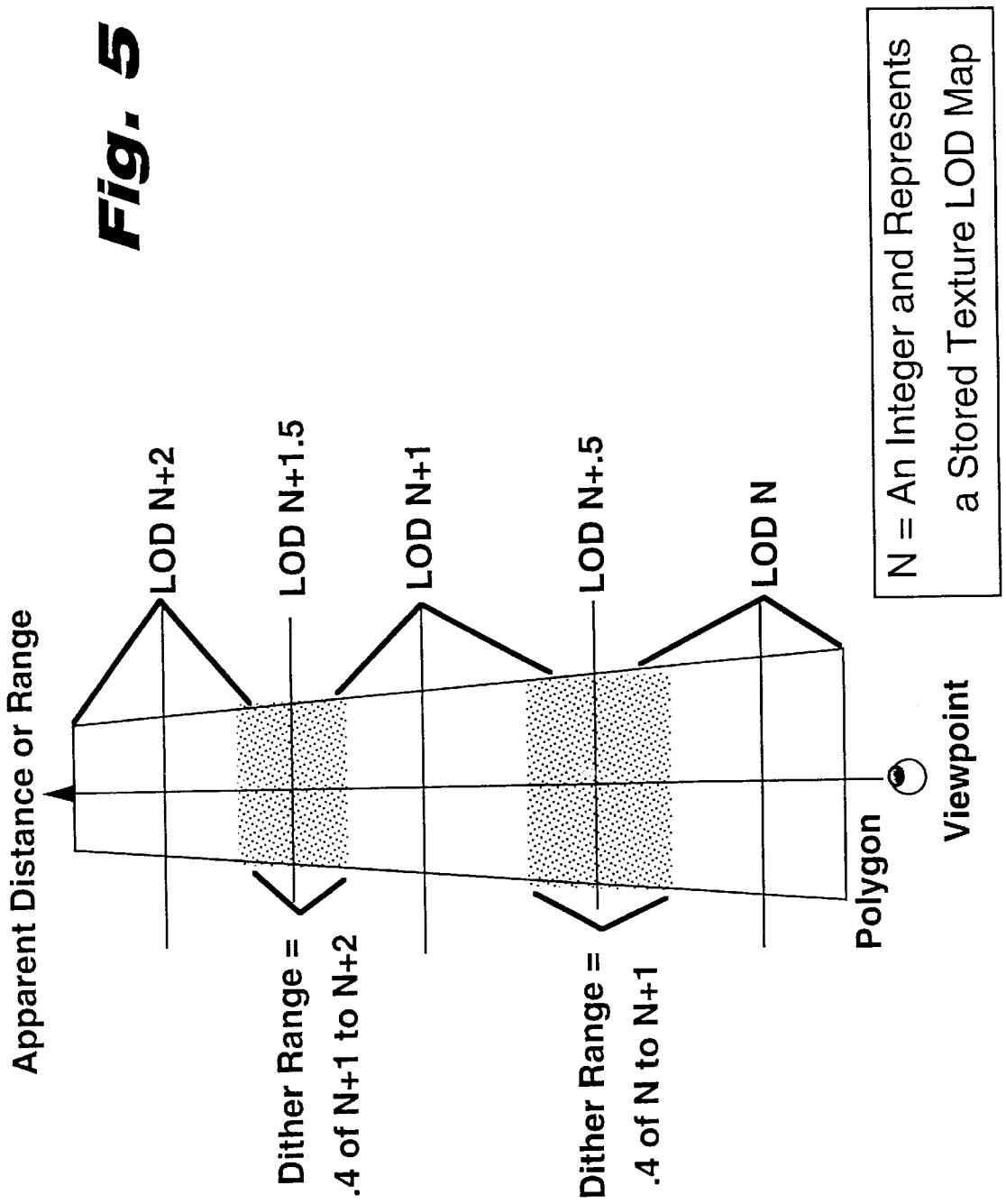
FIG. 5 illustrates a dithering range of 0.4 for a polygon in perspective view.

FIG. 5 illustrates transitions between LODs for the dither range of 0.4 for a rectangular polygon view in perspective. As is well known in the art, the apparent distance is a function of the viewer to polygon distance and the orientation of the polygon with respect to the view ray from the observer to the polygon. The pixels in the shaded transition areas of the polygon are dither blends of adjacent integer LODs. All of the pixels in the white areas of the polygon are assigned to an nearest integer LOD.

Figure 6:
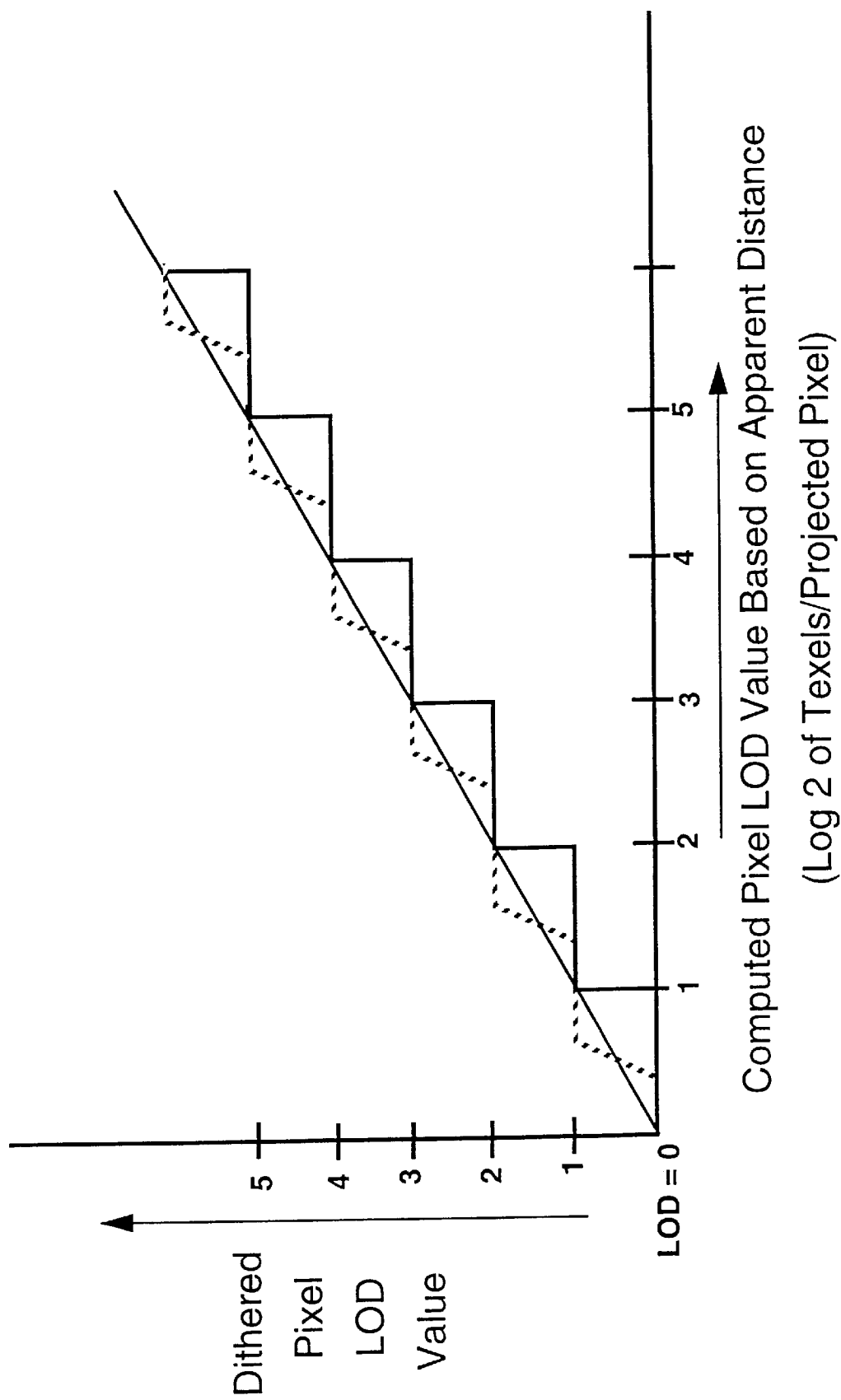
FIG. 6 graphically illustrates the dithered pixel LOD value as a function of the computed pixel LOD value.

FIG. 6 is a graphical illustration of the contribution of a dithering offset to a computed pixel value for 3 representative ranges of dithering: 1) full dithering case [diagonal line]—dither range of 1 (−0.5 to +0.5), 2) no dithering [solid stair-step]—dither range of 0 (0–0), and an intermediate case, 3) partial dithering [dotted line]—dither range of 0.25 (−0.125 to +0.125). The first case, full dithering, is equivalent to what would result in a true trilinear interpolation mode, where each computed LOD value is a candidate for being pulled or pushed into the near or far texture map. As noted above, this may result in unwanted artifacts. The second case, solid staircase line, describes the effect of no dithering. In this case, computed pixel values abruptly transition or jump from one LOD map to the next at some predefined threshold value, typically one-half the distance between the two LOD maps which bracket the object. The third case, represented by the dotted line, represents a dither range of 0.25. In this case the addition of a dither offset will have no effect on ¾ of the computed pixel LOD values. More particularly, the method would not effect those computed pixel offset values whose fractional component, prior to the addition of a dithering offset, is greater than or equal 0.75.

Figure 7:
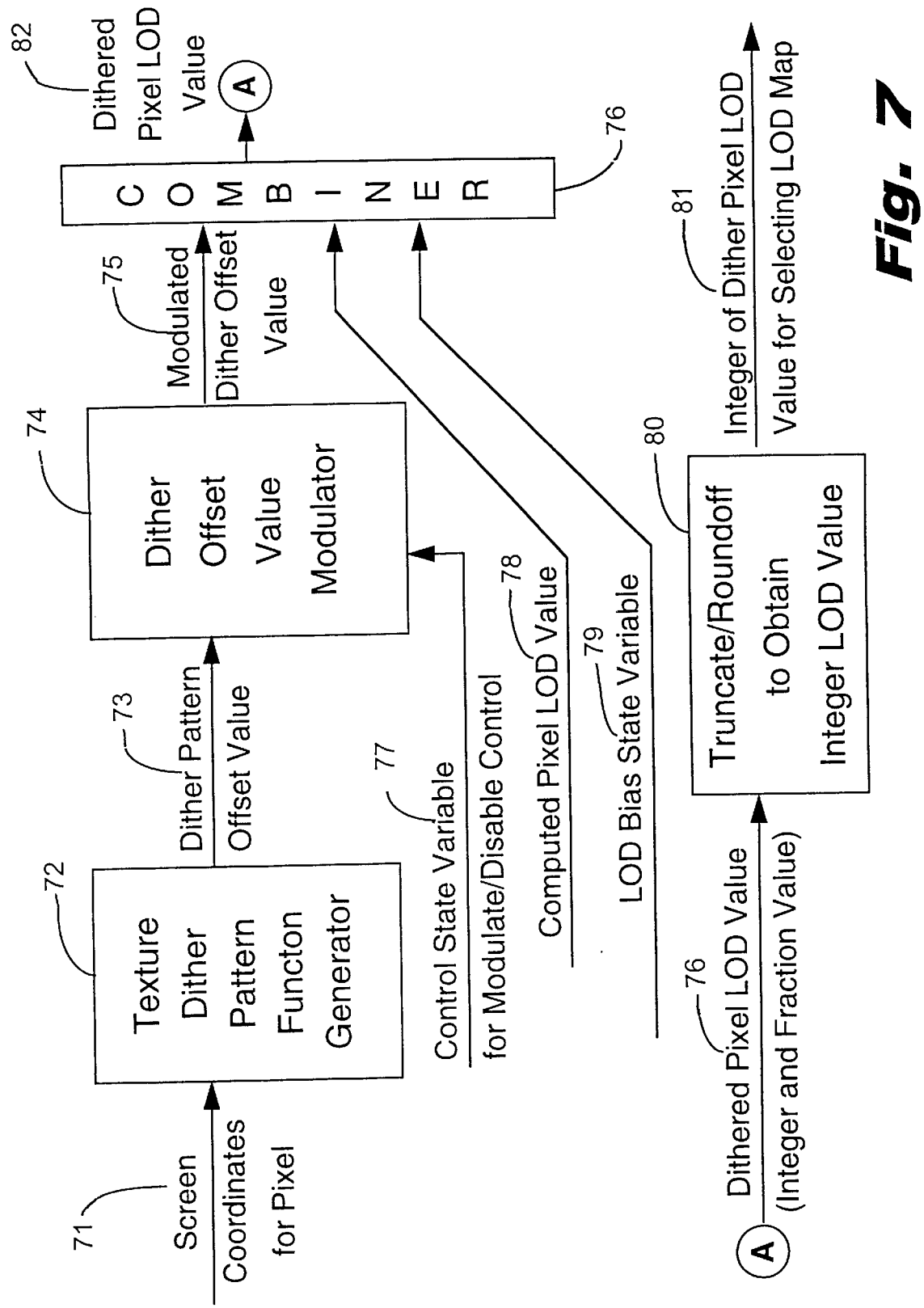
FIG. 7 illustrates a block diagram of a hardware embodiment of the present invention.

FIG. 7 is a block diagram illustrating the general components of a dithering unit apparatus 70 which selects a level of detail (LOD) texture map for each pixel covered by the graphics primitive. The apparatus requires as input the coordinates in screen space of the pixel being texture. For example, the 2 least significant bits 71 of the I and J screen coordinates of the pixel to be textured could be used to represent the location of the pixel. These two values are input as an index into the two-dimensional dither pattern generator 72. The generator 72 may take the form of a table look-up containing the pattern or array of dithering offsets. Alternatively, the generator 72 could be comprised of combinational logic to generate the offsets for different textures or polygons. The function of the pattern generator is to return a single dither offset value based on the address bits of a particular pixel in screen space.

For example, in one embodiment, a table look-up is used in a system that processes polygons a span at a time. The table look-up 72 is organized to mirror the span configuration, such as a 4×4 array, thereby reflecting the physical dimensions of a span. The dithering offset retrieved by the table 72 is determined by utilizing the position of the pixel's position in the current span as an index to the table 72.

From the table look-up 72 a single dither offset value 73 is output and supplied as input to a dither value modulator 74. The modulator 74 is optional. The modulator 74 permits several dithering offset ranges to be available from only one set of values stored in the look-up. The degree of modulation applied to the dither value 73 is determined by a second input to the dither value modulator 74 as a control state variable 77. The modulator 74 can be programed to increase or decrease the stored offset values. For example, the modulator 74 can be an attenuator. In that case, the control state variable 77 can be set to apply dithering offsets in the range of zero to full attenuation, with intermediate values of 1,2, and 3 correspond to one-half, one-fourth and one-eighth attenuation respectively. For example, the control state variable 77 can be 3 bits that are encoded which can provided 8 shifts but only 5 are used. The dithering offset value 73 is a 4 bit number. The attenuator will then shift this number to the right by the amount of attenuation, and 0 is inserted in the leading bits. The attenuation can be 0 shifts (full weight), 1 shift (half) 2 shifts (one-fourth 3 shifts (one-eighth) or 4 shifts (completely shifted, therefore disabled).

The modulated dither value 75 is then input to an adder unit 76 along with the computed pixel LOD value 78 to provide the dithered pixel LOD value 82.

Shown in FIG. 7 is an optional bias means. In this embodiment, an LOD bias state variable 79 is also input to the adder 76. The bias state value is input to permit a truncation of the final added result instead of the more computationally expensive rounding operation which would have to be performed without it to yield similar results. The bias state value can also be used to change the position of where the transitions from one LOD to another occur.

The adder 76 outputs a dithered pixel LOD value 82 with an integer and fractional component. The dithered pixel LOD value is then input to means 80 for performing the mathematical operations of either truncation or rounding to yield an integer number only. The integer portion 81 of the dithered pixel LOD value is output for selecting an LOD map.

Figure 8:
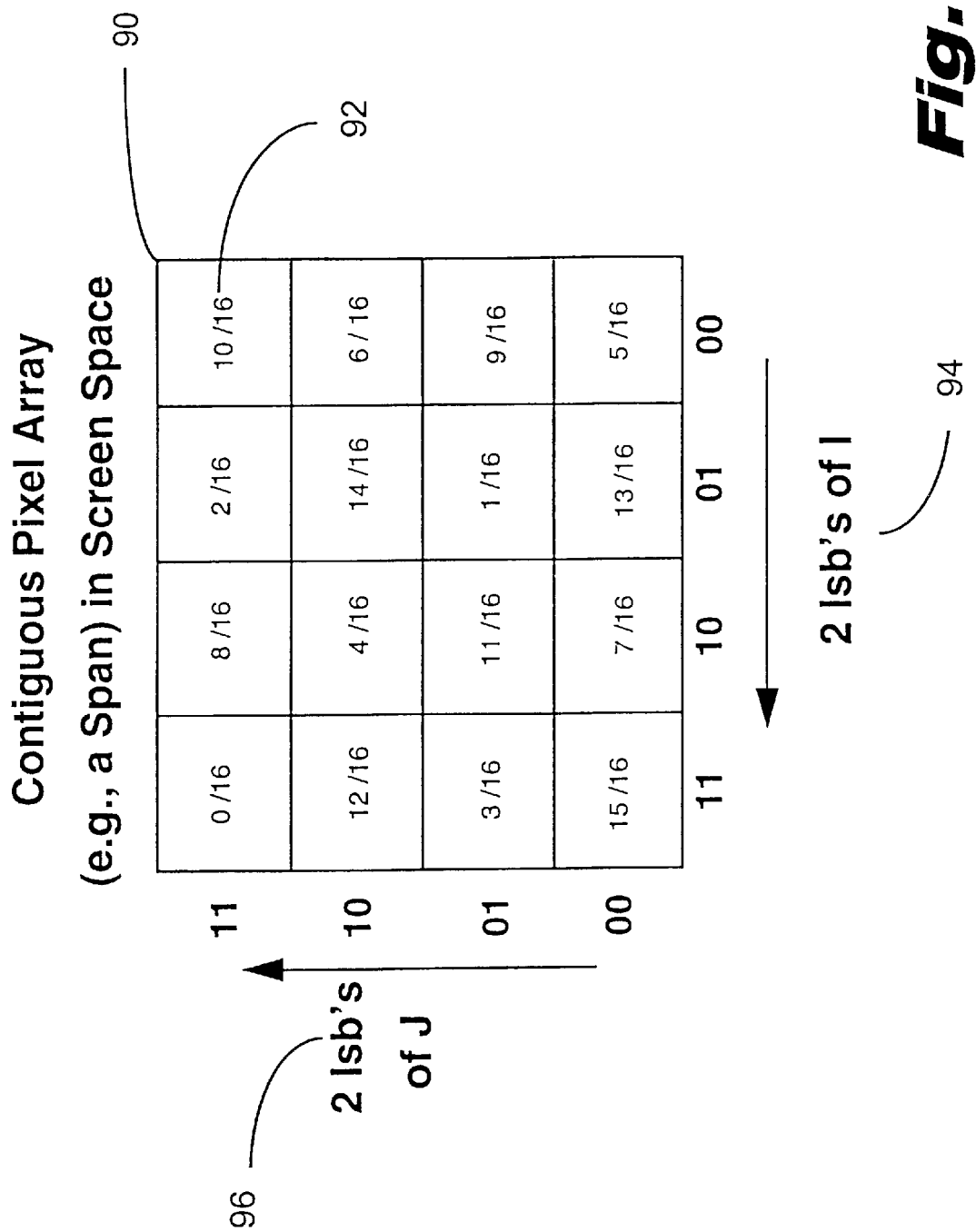
FIG. 8 illustrates one embodiment of a texture dither table matrix.

FIG. 8 is a representation of the internal configuration of the two dimensional texture dither pattern table. The dimensions of the look-up table 90 are matched to the dimensions of a span (4×4) so that selection of a dither offset value from the look-up table for a particular pixel is made by indexing the two least significant bits of the pixel's I and J address in screen space into the table. In the illustrative embodiment, a single look-up table is used for each processed span. However, alternate embodiments could create a dither offset dedicated to each and every pixel in the display space. The dithered offset values 92 stored in the table look up 90 are four bit values ranging from zero to 15/16. In the illustrative embodiment these sixteen values are chosen to be evenly distributed in the selected dither range, however, the method may be implemented to reflect any user selected distribution of values with certain distributions yielding more visually appealing results than others.

While several embodiments and variations of the present invention are described in detail herein, it should be apparent that the disclosure and teachings of the present invention will suggest many alternative designs to those skilled in the art and that the scope of the invention should be limited only by the claims appended hereto.

Having thus described our invention, what we claim as new and desire to secure by Letters Patent is:

1. In a computer image generation system for generating an image of an object by controlling the value of pixels forming the image of the object, the value for each pixel being derived from stored data including texture data for applying texture to the object, the texture data being stored in a sequence of texture maps consisting of a plurality of levels of detail (LODs) versions of the texture data, a method of transitioning between LODs for applying the texture to the object, the method comprising:

computing a texture LOD value for each pixel representing the image of the object;

providing a dithering offset value for and an LOD bias value each pixel;

for each pixel, combining the dithering offset value, the LOD bias value, and the computed LOD value for the pixel to obtain a dithered pixel LOD value for each said pixel; and outputting the dithered pixel LOD value for each pixel for selecting an associated texture LOD map.

2. The method of claim 1 wherein said step of providing a dithering offset value includes selecting a dithering offset value from said range of dithering offset values based on the location of the pixel.

3. The method of claim 2 wherein the step of selecting includes basing the selecting on the location of the pixel in a span of pixels.

4. The method of claim 1 further including the step of modulating the provided dithering offset value.

5. The method of claim 4 wherein the step of modulating includes attenuating the provided dithering offset value.

6. The method of claim 5 wherein the step of attenuating includes shifting bits representing the dithering offset value based on a control state variable.

7. The method of claim 4 wherein the step of attenuating is provided in discrete steps from full attenuation to zero attenuation.

8. The method of claim 1 wherein the step of applying includes adding the dithering offset value to said computed pixel LOD value.

9. The method of claim 1 further including computing an integer value from said dithered pixel LOD value comprised of an integer and a fraction by one of truncating and rounding.

10. In a computer image generation system for generating an image of an object by controlling the value of pixels forming the image of the object, the value for each pixel being derived from stored data including texture data for applying texture to the object, the texture data being stored in a sequence of texture maps consisting of a plurality of levels of detail (LOD) versions of the texture data, a method of transitioning between LODs for applying the texture to the object, an apparatus for determining the LODs to be used for each pixel that reduces artifacts when transitioning between LODs when applying texture to the object, the apparatus comprising:

a dither pattern function generator for generating a dithering offset value for each pixel representing the image of the object to be textured; and an input for providing an LOD bias value;

a combiner for receiving a computed pixel LOD value, a dithering offset value, and the LOD bias value for each said pixel, said dithering offset value being received from said dither pattern function generator, and for combining said computed pixel LOD value, the dithering offset value and the LOD bias value to produce a dithered pixel LOD value for each pixel.

11. The apparatus of claim 10 wherein said dither pattern function generator includes a table look-up.

12. The apparatus of claim 10 wherein said dither pattern function generator includes means for selecting a dithering offset value from said table look-up based on the location of the pixel.

13. The apparatus of claim 12 wherein the number of dithering offset values in said table look-up being equal to the number of pixels in a span of pixels, and said means for selecting includes means for basing the selecting on the location of the pixel in said span of pixels.

14. The apparatus of claim 10 further including a modulator coupled between said dither pattern function generator and said combiner.

15. The apparatus of claim 14 wherein modulator includes means for attenuating the dithering offset value.

16. The apparatus of claim 15 wherein the means for attenuating includes means for shifting bits representing the dithering offset value based on a control state variable.

17. The apparatus of claim 16 wherein the means for attenuating includes means for providing the attenuation in discrete steps from full attenuation to zero attenuation.

18. The apparatus of claim 10 wherein said combiner is an adder.

19. The apparatus of claim 10 further including means for computing an integer value from said dithered pixel LOD value comprised of an integer and a fraction by one of truncating and rounding.

* * * * *